(12) United States Patent
Chen et al.

(10) Patent No.: US 12,032,119 B2
(45) Date of Patent: Jul. 9, 2024

(54) OPTICAL STACK STRUCTURE

(71) Applicant: TPK Advanced Solutions Inc., Fujian (CN)

(72) Inventors: Huang Chen, Xiamen (CN); Ching Mao Huang, New Taipei (TW); Wei Sheng Chen, Zhangpu County (CN)

(73) Assignee: TPK Advanced Solutions Inc., Fujian (CN)

( * ) Notice: Subject to any disclaimer, the term of this patent is extended or adjusted under 35 U.S.C. 154(b) by 2 days.

(21) Appl. No.: 17/731,492

(22) Filed: Apr. 28, 2022

(65) Prior Publication Data
US 2023/0350098 A1   Nov. 2, 2023

(51) Int. Cl.
G02B 1/04 (2006.01)
G02B 1/14 (2015.01)
G06F 3/041 (2006.01)
H01B 1/22 (2006.01)
H01B 3/30 (2006.01)

(52) U.S. Cl.
CPC .......... *G02B 1/04* (2013.01); *G02B 1/14* (2015.01); *H01B 1/22* (2013.01); *H01B 3/308* (2013.01); *G06F 3/04164* (2019.05)

(58) Field of Classification Search
CPC .............. G02B 1/14; H01B 1/20–1/24; H01B 3/30–3/448; B32B 5/00–5/32; B32B 27/00–27/42
See application file for complete search history.

(56) References Cited

U.S. PATENT DOCUMENTS

| | | | |
|---|---|---|---|
| 2010/0243295 A1* | 9/2010 | Allemand | H01B 1/22 174/250 |
| 2015/0359105 A1* | 12/2015 | Yoon | C09D 129/04 174/268 |
| 2021/0087429 A1* | 3/2021 | Leppäjärvi | C08F 283/12 |
| 2022/0285044 A1* | 9/2022 | Liu | B05D 3/06 |

FOREIGN PATENT DOCUMENTS

| | | |
|---|---|---|
| CN | 103155174 B | 6/2017 |
| TW | I525033 B | 3/2016 |
| TW | I647516 B | 1/2019 |
| WO | WO-2021018315 A1 * | 2/2021 ............ B05D 1/26 |

* cited by examiner

*Primary Examiner* — Prashant J Khatri
(74) *Attorney, Agent, or Firm* — Cooper Legal Group, LLC (57) ABSTRACT

An optical stack structure includes a metal nanowire layer and an organic polymer layer. A crosslinking degree of the organic polymer layer is greater than or equal to 80% and less than or equal to 100%, and a content of volatile organic compounds in the organic polymer layer is less than or equal to 1%. The content of the volatile organic compounds in the organic polymer layer is defined as a difference between a thermal weight loss of the organic polymer layer measured at a measuring temperature and a water content of the organic polymer layer measured at the measuring temperature.

13 Claims, 6 Drawing Sheets

OPTICAL STACK STRUCTURE

BACKGROUND

Field of Disclosure

The present disclosure relates to an optical stack structure.

Description of Related Art

With the development of touch technology, transparent conductors are usually used in many touch-related devices because they can simultaneously allow light to pass through and provide proper conductivity. Generally speaking, transparent conductors may be various metal oxides, such as indium tin oxide, indium zinc oxide, cadmium tin oxide, or aluminum doped zinc oxide. However, films made of these metal oxides cannot meet the flexibility requirements of touch devices. Hence, nowadays a variety of flexible transparent conductors have been developed, such as transparent conductors made of materials including metal nanowires, etc.

However, there are still many problems to be solved for touch devices made of metal nanowires. For example, when metal nanowires are used to fabricate touch electrodes or peripheral circuits in a touch device, the optical clear adhesive (OCA) disposed in the touch device is usually unable to have good compatibility with metal nanowires because of the properties of the polymer(s) contained therein. As a result, the optical adhesive layer will attack (corrode) the metal nanowires, thus making the metal nanowires tend to have electromigration. Therefore, the reliability of the metal nanowires is not sufficient to cause short circuit or open circuit of the touch device and the specification requirements for product reliability testing cannot be met.

SUMMARY

According to some embodiments of the present disclosure, an optical stack structure includes a metal nanowire layer and an organic polymer layer. A crosslinking degree of the organic polymer layer is greater than or equal to 80% and less than or equal to 100%, and a content of volatile organic compounds in the organic polymer layer is less than or equal to 1%. The content of the volatile organic compounds in the organic polymer layer is defined as a difference between a thermal weight loss of the organic polymer layer measured at a measuring temperature and a water content of the organic polymer layer measured at the measuring temperature.

In some embodiments of the present disclosure, the metal nanowire layer includes a plurality of metal nanowires, and the organic polymer layer directly contacts and encapsulates the metal nanowires.

In some embodiments of the present disclosure, the metal nanowire layer includes a matrix and a plurality of metal nanowires distributed in the matrix, and the organic polymer layer is disposed on the metal nanowire layer.

In some embodiments of the present disclosure, a crosslinking degree of the matrix is greater than or equal to 80% and less than or equal to 100%, a content of volatile organic compounds in the matrix is less than or equal to 1%, and the content of the volatile organic compounds in the matrix is defined as a difference between a thermal weight loss of the matrix measured at the measuring temperature and a water content of the matrix measured at the measuring temperature.

In some embodiments of the present disclosure, some of the metal nanowires are embedded into the organic polymer layer.

In some embodiments of the present disclosure, the optical stack structure further includes a passivation layer disposed between the metal nanowire layer and the organic polymer layer. Some of the metal nanowires are embedded into the passivation layer.

In some embodiments of the present disclosure, a crosslinking degree of the passivation layer is greater than or equal to 80% and less than or equal to 100%, a content of volatile organic compounds in the passivation layer is less than or equal to 1%, and the content of the volatile organic compounds in the passivation layer is defined as a difference between a thermal weight loss of the passivation layer measured at the measuring temperature and a water content of the passivation layer measured at the measuring temperature.

In some embodiments of the present disclosure, the optical stack structure further includes a passivation layer. The metal nanowire layer includes a plurality of metal nanowires. The passivation layer is disposed between the metal nanowires and the organic polymer layer, and the passivation layer directly contacts and encapsulates the metal nanowires.

In some embodiments of the present disclosure, the optical stack structure further includes a cover plate disposed on the organic polymer layer. A content of potassium element and a content of calcium element measured by an energy-dispersive X-ray (EDX) analysis of a material of the cover plate are respectively less than or equal to 1%.

In some embodiments of the present disclosure, the optical stack structure further includes a cover plate disposed on the organic polymer layer. A content of sodium element and a content of potassium element measured by an energy-dispersive X-ray (EDX) analysis of a material of the cover plate are respectively less than or equal to 1%.

According to the aforementioned embodiments of the present disclosure, the optical stack structure of the present disclosure includes the metal nanowire layer and the organic polymer layer. Since the organic polymer layer has the crosslinking degree and the content of the volatile organic compounds specified by the present disclosure, the organic polymer layer can be ensured not to attack (or corrode) the metal nanowires in the metal nanowire layer. As a result, the optical stack structure of the present disclosure can achieve the specification requirements for product reliability testing, and the touch product including the optical stack structure is ensured to have high touch sensitivity.

BRIEF DESCRIPTION OF THE DRAWINGS

The disclosure can be more fully understood by reading the following detailed description of the embodiments, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

In addition, relative terms such as "lower" or "bottom" and "upper" or "top" can be used herein to describe the relationship between one element and another element, as shown in the figures. It should be understood that relative terms are intended to include different orientations of the device other than those shown in the figures. For example, if the device in one figure is turned over, elements described as being on the "lower" side of other elements will be oriented on the "upper" side of the other elements. Therefore, the exemplary term "lower" may include an orientation of "lower" and "upper", depending on the specific orientation of the drawing. Similarly, if the device in one figure is turned over, elements described as "below" other elements will be oriented "above" the other elements. Therefore, the exemplary term "below" can include an orientation of "above" and "below".

Figure 1A:
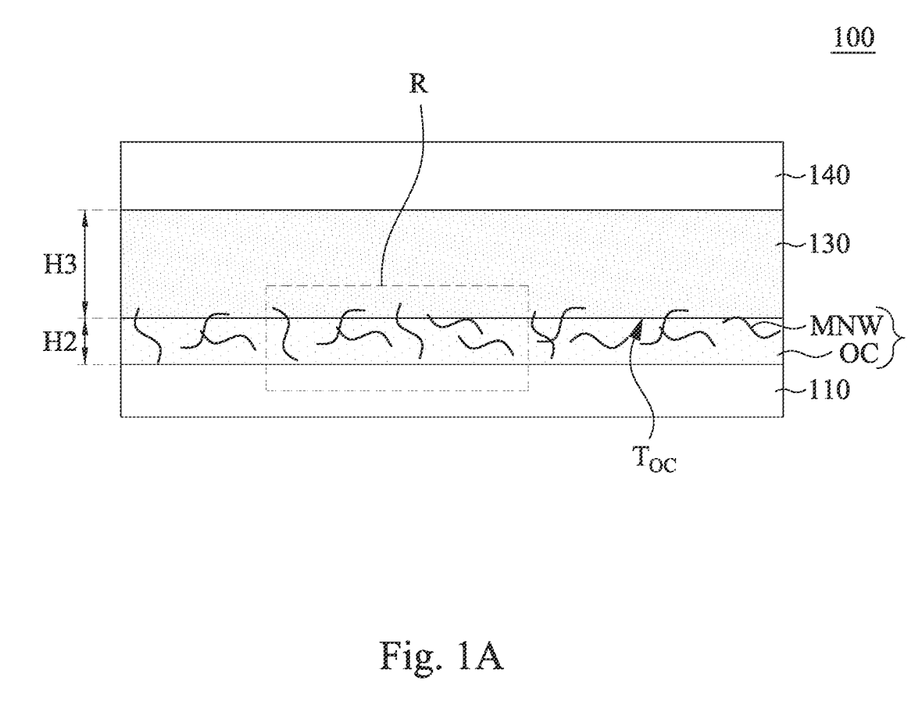
FIG. 1A depicts a schematic diagram of a stacking structure of an optical stack structure according to some embodiments of the present disclosure.

FIG. 1A depicts a schematic diagram of a stacking structure of an optical stack structure 100 according to some embodiments of the present disclosure. The optical stack structure 100 includes a metal nanowire layer 120 and an organic polymer layer 130. In some embodiments, the optical stack structure 100 may be, for example, a part of a touch device (e.g., touch sensor, touch panel), and the optical stack structure 100 may be located in a visible area and/or a peripheral area of the touch device to realize a touch function and/or transmit a signal to an electronic component, such as an external processor. In some embodiments, the optical stack structure 100 may further include a substrate 110 configured to carry the metal nanowire layer 120 and the organic polymer layer 130, and the substrate 110 may be, for example, a rigid transparent substrate or a flexible transparent substrate. In some embodiments, a material of the substrate 110 may include but is not limited to a transparent material including glass, acrylic, polyvinyl chloride, polystyrene, polycarbonate, polypropylene, cyclic olefin polymer, cyclic olefin copolymer, polyethylene terephthalate, polyethylene naphthalate, colorless polyimide, or a combination thereof. In some embodiments, the optical stack structure 100 may further include a cover plate 140 disposed on the organic polymer layer 130. Overall speaking, the substrate 110 and the cover plate 140 can jointly sandwich the metal nanowire layer 120 and the organic polymer layer 130, which are between the substrate 110 and the cover plate 140.

Figure 1B:
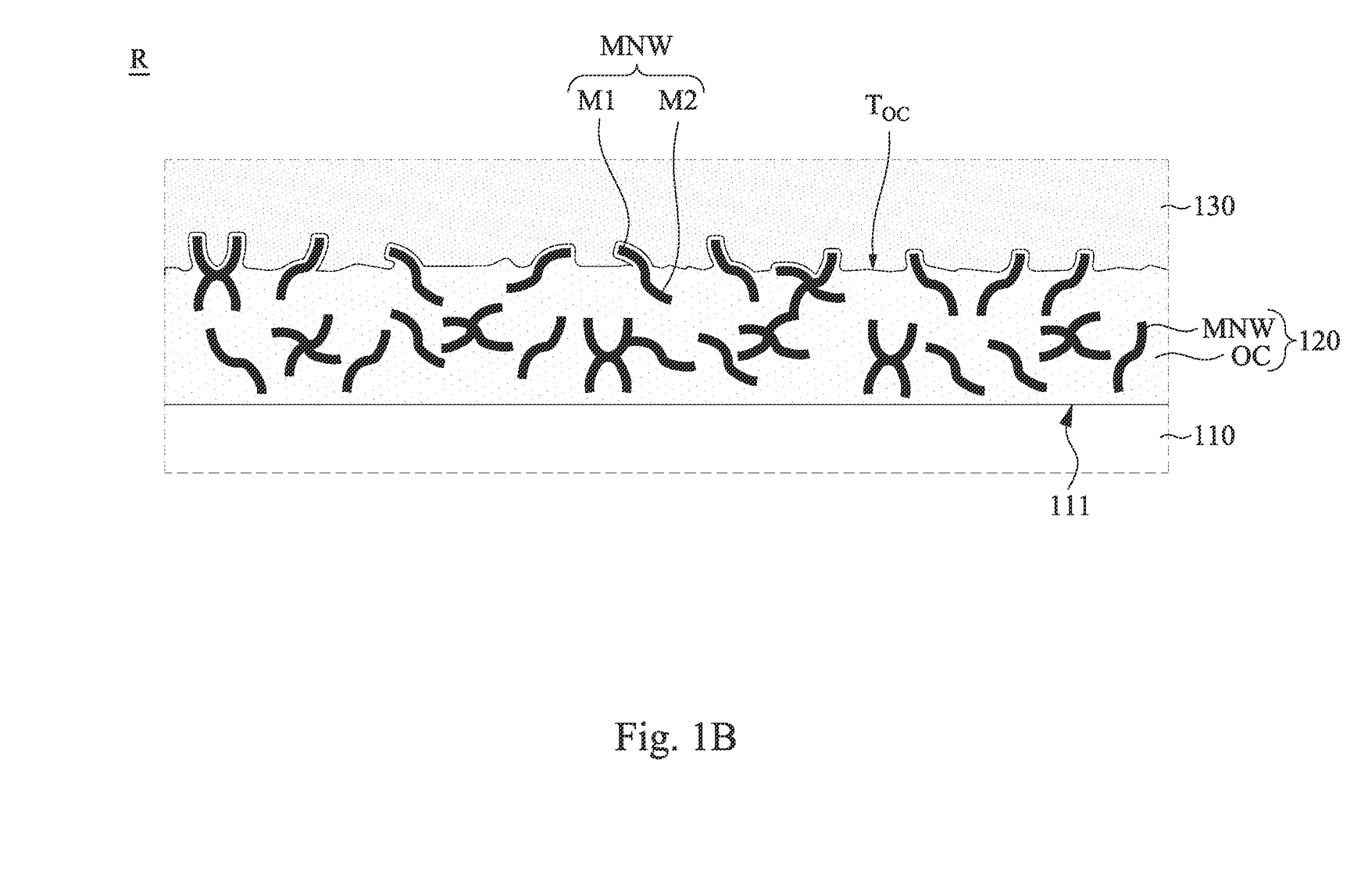
FIG. 1B depicts a partially enlarged schematic view of an area R of the optical stack structure in FIG. 1A.

In some embodiments, the metal nanowire layer 120 may include a matrix OC and a plurality of metal nanowires MNW distributed in the matrix OC. In some embodiments, the matrix OC may include specific polymers or a mixture thereof to impart specific chemical, mechanical, and optical properties to the metal nanowire layer 120. For example, the matrix OC can provide the metal nanowire layer 120 with good adhesion between other layers. As another example, the matrix OC can provide the metal nanowire layer 120 with good mechanical strength. As still another example, the matrix OC can enable the metal nanowire layer 120 to have extra anti-scratch and anti-wear surface protection to enhance the surface strength of the metal nanowire layer 120. Each of the above specific polymers may be, for example, polysiloxane, polysilane, polyacrylate, polyurethane, poly(silicon-acrylic), epoxy resin, or a combination thereof. In some embodiments, the metal nanowires MNW may include but are not limited to silver nanowires, gold nanowires, copper nanowires, nickel nanowires, or a combination thereof. "Metal nanowires" herein is a collective term that refers to a collection of metal wires including a plurality of metal elements, metal alloys, or metal compounds (including metal oxides), and a number of the metal nanowires MNW included in the metal nanowire layer 120 is not limited in the present disclosure. In some embodiments, a thickness H2 of the metal nanowire layer 120 may be, for example, greater than or equal to 40 nanometers (nm) and less than or equal to 50 nm, such that the metal nanowire layer 120 can better take into account its electrical and optical properties, the possibility of unnecessary visibility of the metal nanowire layer 120 caused by the excessively great thickness H2 is reduced, and the possibility that the sheet resistance of the metal nanowire layer 120 is too large due to the excessively small thickness H2 is reduced. In addition, a description is provided with reference to FIG. 1B. FIG. 1B depicts a partially enlarged schematic view of an area R of the optical stack structure 100 in FIG. 1A. When observed on a microscopic scale, the metal nanowires MNW are randomly distributed on a surface 111 of the substrate 110 and in the matrix OC in a non-directional manner, and some of the metal nanowires MNW are distributed near a top surface $T_{OC}$ of the matrix OC. Hence, the top surface $T_{OC}$ of the matrix OC presents an uneven and undulating state.

Reference is made to FIG. 1A and FIG. 1B. In some embodiments, the organic polymer layer 130 may be stacked on the metal nanowire layer 120, and each of the metal nanowires MNW adjacent to the top surface $T_{OC}$ of the matrix OC may further be partially embedded into the organic polymer layer 130. In greater detail, each of the metal nanowires MNW adjacent to the top surface $T_{OC}$ of the matrix OC may have a first portion M1 and a second portion M2. The first portions M1 of the metal nanowires MNW are embedded into the organic polymer layer 130 and are spaced apart from the organic polymer layer 130 by the matrix OC (that is, the top surface $T_{OC}$ of the matrix OC is conformal to a profile of the first portions M1 of the metal nanowires MNW, and the top surface $T_{OC}$ of the matrix OC is between the organic polymer layer 130 and the first portions M1 of the metal nanowires MNW). The second portions M2 of the metal nanowires MNW are located in the matrix OC and are not embedded into the organic polymer layer 130. Overall speaking, the top surface $T_{OC}$ of the matrix OC not only contacts the organic polymer layer 130, but is also partially embedded into the organic polymer layer 130. In some embodiments, the organic polymer layer 130 may be, for example, an optically clear adhesive (OCA), which can have high light transmittance, such that the optical stack structure 100 has good optical properties. The organic polymer layer 130 is configured to protect the metal nanowire layer 120 so as to reduce the possibility that the metal nanowires MNW in the metal nanowire layer 120 are attacked by moisture invaded by the external environment. The present disclosure improves adaptability (compatibility) between the organic polymer layer 130 and the metal nanowires MNW in the metal nanowire layer 120 by making a crosslinking degree (a degree of crosslinking) of the organic polymer layer 130 fall within a suitable range and by making a content of volatile organic compounds in the organic polymer layer 130 fall within a suitable range to ensure that the organic polymer layer 130 itself will not attack (or corrode) the metal nanowires MNW in the metal nanowire layer 120. As a result, the specification requirements for product reliability testing are met. Additionally, it is ensured that the touch product including the optical stack structure 100 has high touch sensitivity. In the following description, "the crosslinking degree of the organic polymer layer 130" and "the content of the volatile organic compounds in the organic polymer layer 130" will be described in greater detail.

First, for "the crosslinking degree of the organic polymer layer 130", a material of the organic polymer layer 130 of the present disclosure is a polymer, and it is believed that those skilled in the art can understand that the polymer can be obtained by polymerizing monomers in the presence of a photoinitiator by irradiation with UV light. Herein, "the crosslinking degree of the organic polymer layer 130" refers to the percentage of monomers that form the polymer through actually linking after the monomers used to prepare the organic polymer layer 130 are polymerized (expressed as a percentage, unit is %). When the crosslinking degree is excessively low, it may represent that the photoinitiator fails to react sufficiently, which results in an excessive amount of the photoinitiator remaining in the organic polymer layer 130. As a result, the residual photoinitiator may further decompose the polymer in the formed (cured) organic polymer layer 130 to cause the polymer to be degraded so as to form low molecular weight volatile organic compounds (VOC), such as oligomers or monomers, and then the metal nanowires MNW in the metal nanowire layer 120 are corroded. In addition, since the photoinitiator itself is also one kind of volatile organic compound, the residual photoinitiator will also corrode the metal nanowires MNW in the metal nanowire layer 120. Based on the above, the present disclosure ensures that the organic polymer layer 130 does not attack (corrode) the metal nanowires in the metal nanowire layer 120 by controlling the crosslinking degree of the organic polymer layer 130 to be greater than or equal to 80% and less than or equal to 100%. As a result, the specification requirements for product reliability testing are met, and the touch product containing the optical stack structure 100 is ensured to have high touch sensitivity.

In some embodiments, the photoinitiator can be selected from but not limited to Norrish type I photoinitiator or a Norrish type II photoinitiator. Specifically, the Norrish type I photoinitiator can be, for example, 1-hydroxycyclohexyl phenyl ketone, 2-hydroxy-4'-(2-hydroxyethoxy)-2-methyl-propiophenone, 2,2-diethoxyacetophenone, 2-hydroxy-2-methylpropiophenone, 1,1'-(methylene-di-4,1-phenylene) bis[2-hydroxy-2-methyl-1-propanone], 2-hydroxy-4'-(2-hydroxyethoxy)-2-methyl-propiophe, 2-hydroxy-1-[4-{4-(2-hydroxy-2-methyl-propionyl)benzyl}phenyl]-2-methyl-propan-1-one, benzene, (1-methylethenyl)-, homopolymer, ar-(2-hydroxy-2-methyl-1-oxopropyl) derivs, 2,2-dimethoxy-1,2-diphenylethan-1-one, benzyl methyl glyoxylate, 2-benzyl-2-(dimethylamino)-4'-morpholinobutyrophenone, 2-methyl-4'-(methylthio)-2-morpholinopropiophenone, 2-(dimethylamino)-2-[(4-methylphenyl)methyl]-1-[4-(4-morpholinyl)phenyl]-1-butanone, phenyl bis(2,4,6-trimethylbenzoyl)-phosphine oxide, diphenyl(2,4,6-trimethylbenzoyl)phosphine oxide, (2,4,6-trimethylbenzyl) ethoxyphenylphosphine oxide, ethyl (2,4,6-trimethylbenzoyl) phenylphosphinate, bis(2,6-dimethoxybenzyl)2,4,4-trimethylpentylphosphine oxide, a derivative of any of the above compounds, or a combination of any of the above compounds or derivatives; the Norrish type II photoinitiator can be, for example, benzophenone, 4-benzoylbiphenyl, 4-chlorobenzophenone, 4-methylbenzophenone, 4,4'-bis(dimethylamino)benzophenone, 4,4'-bis(diethylamino)-benzophenone, 2,4,6-Trimethylbenzophenone, 4-methoxy-3,3'-dimethylbenzophenone, 4,4'-bis(dimethylamino)benzophenone, 4-benzoylphenyl methacrylate, methyl ethyl Michler's ketone, 2-ethylhexyl 4-(dimethylamino)benzoate, ethyl 4-(dimethylamino)benzoate, 2-(dimethylamino)ethyl benzoate, bis(2-phenyl-2-oxoacetic acid)oxybisethylene ester, benzyl methyl glyoxylate, methyl 2-benzoylbenzoate, a mixture of oxy-phenyl-acetic acid 2-[2-oxo-2-phenyl-acetoxy-ethoxy]ethyl ester and oxy-phenyl-acetic acid 2-[2-hydroxy-ethoxy]ethyl ester, thioxanthen-9-one, 2-chlorothioxanthone, 3-methyl thioxanthone, 2,4-dimethylthioxanthen-9-one, (4-methylphenyl) [4-(2-methylpropyl)phenyl] iodonium hexafluorophosphate, 2-isopropylthioxanthone, 2,4-Diethyl-thioxanthen-9-one, 4-isopropylthioxanthone, 2-chlorothioxanthen-9-one, 1-chloro-4-propoxy-9H-thioxanthen-9-one, anthraquinone, methylanthraquinone, 2-ethylanthraquinone, 2-tert-butylanthraquinone, 2-aminoanthraquinone, camphorquinon, a derivative of any of the above compounds, a combination of any of the above compounds, mixtures, or derivatives. Based on the fact that the Norrish type I photoinitiator no longer has the function of the photoinitiator after being excited once, in some preferred embodiments, the Norrish type I photoinitiator can be selected as the photoinitiator for preparing the organic polymer layer 130 to reduce unreacted photoinitiator residues. In greater detail, the guidelines for the use of reagents for the Norrish type I photoinitiator or Norrish type II photoinitiator commonly used in this field can be referred to, and the actual needs of the organic polymer layer 130, such as hardness, thickness, modulus, etc. can serve as a basis to adjust the added amounts of the photoinitiator.

Figure 2:
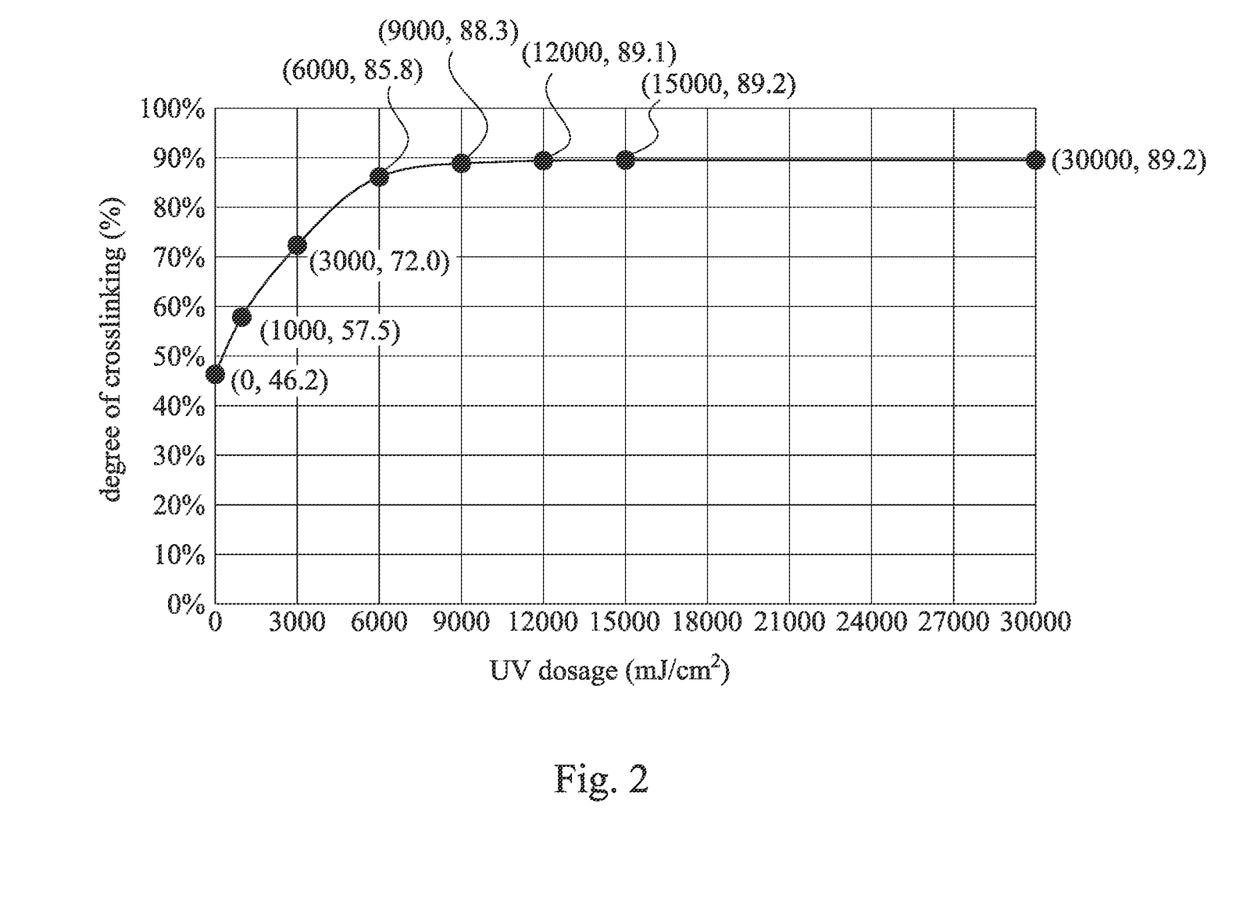
FIG. 2 depicts a relationship graph between a crosslinking degree (degree of crosslinking) and an ultraviolet (UV) dosage according to some embodiments of the present disclosure.

In some embodiments, the polymerization reaction can be improved to be more complete by controlling the UV dosage to increase the crosslinking degree. In this manner, the formation of residual low molecular weight volatile organic compounds, such as oligomers or monomers, etc., caused by incomplete reaction can be reduced. In greater detail, reference is made to FIG. 2. FIG. 2 depicts a relationship graph between a crosslinking degree and a UV dosage according to some embodiments of the present disclosure. In the polymerization reaction represented by FIG. 2, the photoinitiator used is benzophenone. As can be seen from FIG. 2, when the UV dosage is between 0 mJ/cm$^2$ and 3000 mJ/cm$^2$, it is easy to cause a low crosslinking degree due to insufficient energy, thus resulting in an incomplete polymerization reaction. When the polymerization reaction is not complete, it is easy to further generate volatile organic compounds that are harmful to the polymerization reaction (for example, peroxides, free radicals, polar residues after the reaction, etc.), which makes it difficult to increase the crosslinking degree. The vicious cycle will be unfavorable for the polymerization reaction to proceed. When the UV dosage reaches 6000 mJ/cm$^2$, the crosslinking degree can reach 85.8%, that is, reach the desired value of the present disclosure (greater than or equal to 80%), and when the UV dosage reaches 12000 mJ/cm$^2$ or more, the crosslinking degree can further be maintained at 89.1% to 89.2% steadily. It is thus understood that, by providing a sufficient amount of UV light at once (that is, increasing the UV dosage to a specific value at once, in the embodiment of FIG. 2 the specific value falls within, for example, from 12000 mJ/cm$^2$ to 15000 mJ/cm²), not only can the crosslinking degree of the organic polymer layer 130 be improved, but the generation of the volatile organic compounds can also be prevented. As a result, the organic polymer layer 130 is ensured not to attack (or corrode) the metal nanowires MNW in the metal nanowire layer 120. It should be noted that, although FIG. 2 is the relationship graph between the crosslinking degree and the UV dosage according to only one embodiment of the present disclosure, curve relationships similar to that shown in FIG. 2 could be obtained after the inventors tried to carry out the polymerization reaction by using other photoinitiators. Providing a sufficient amount of UV light at a time can indeed help improve the crosslinking degree.

A description about a method for measuring the crosslinking degree of the organic polymer layer 130 is further provided. In the present disclosure, the crosslinking degree of the organic polymer layer 130 can be obtained by measuring a weight change of the organic polymer layer 130 before and after being soaked in a solvent. In greater detail, the method for measuring the crosslinking degree of the organic polymer layer 130 includes the following steps. Step S1: Remove about 0.1 grams (g) from the organic polymer layer 130 (polymer for short) in a product by using a heating-wire-cutting method or a freezing method. The heating-wire-cutting method includes placing the product (for example, a touch module or a display module) on a heating plate with a temperature of 80° C. for 30 seconds, and cutting the polymer by using a molybdenum wire having a diameter of 0.1 millimeters (mm) to separate the polymer from the product, and then using a polyethylene terephthalate (PET) film to adhere to the polymer. The freezing method includes placing the product in an environment with a temperature of −80° C. for 0.5 hours, and immediately after removing the product using a hard film to insert between the layer where the polymer is located and another layer so that the polymer is separated from the product, and then peeling off the polymer at an angle of 180 degrees or using a PET film to adhere to the polymer. Step S2: Cut a stainless steel mesh with a mesh number of 60 mesh/inch into a piece having an area of 4 cm×6 cm, and weigh the cut stainless steel mesh and record (weight W1). Step S3: Flatten the polymer removed in step S1 as much as possible and place it on the stainless steel mesh. Step S4: Fold the stainless steel mesh to have two creases parallel to the short sides of the stainless steel mesh, such that the stainless steel mesh is equally divided into three equal parts. During the folding process, do not let the polymer on the stainless steel mesh touch each other and stick. Step S5: Cut two ends of each of the creases of the stainless steel mesh once, and fold the two equal parts on the outer sides of the stainless steel mesh along the creases toward the middle, such that the polymer is completely surrounded by the stainless steel mesh to form a sample, and weigh the sample and record (weight W2). Step S6: Put the sample into a 50 mL cylindrical glass, and pour 30 mL of solvent (the solvent includes 90 parts by volume of ethyl acetate and 10 parts by volume of isopropanol) into the cylindrical glass containing the sample, and confirm that the solvent completely covers the sample and the sample is not floating in the cylindrical glass (that is, confirm that the sample sinks to the bottom of the cylindrical glass). Step S7: Seal the cylindrical glass with a lid, and place the cylindrical glass in a fume hood at room temperature (e.g., 18-22° C. or about 25° C.) and normal pressure (e.g., about 1 atm) for 48 hours. Step S8: Take the sample that has been soaked for 48 hours out of the cylindrical glass and place it on the aluminum pan that has been weighed and recorded in advance (weight W3), and then put the aluminum pan together with the sample into an oven having exhaust function and a temperature of 100° C. for 1 hour. Step S9: Take out the baked aluminum pan together with the sample and weigh the aluminum pan together with the sample and record (W4) after they return to room temperature. Step S10: Calculate a weight change of the polymer (the organic polymer layer 130) before and after being soaked in the solvent according to the following formula (1) to obtain the crosslinking degree of the organic polymer layer 130 (represented by Gel (%), the unit is %). After the above step S1 to step S10, the crosslinking degree of the organic polymer layer 130 of the present disclosure can be obtained.

$$Gel(\%)=100\%\times(W4-W3-W1)/(W2-W1) \qquad \text{Formula(1)}$$

Then, for "the content of the volatile organic compounds in the organic polymer layer 130", when there are excessive volatile organic compounds remaining in the organic polymer layer 130, it is easy to cause the organic polymer layer 130 to corrode the metal nanowires MNW in the metal nanowire layer 120 as mentioned previously, thus causing the product containing the optical stack structure 100 to fail to pass the reliability test. In some embodiments, the content of the volatile organic compounds in the organic polymer layer 130 can be adjusted by controlling the contents of crosslinking agent, adhesion promoter, and auxiliary agent added in the polymerization reaction and the content of oligomer generated during the polymerization reaction. In greater detail, the crosslinking agent can promote the crosslinking reaction of the monomers, and may be, for example, a monomer or an oligomer with multiple functional groups. The adhesion promoter may, for example, have a highly polar functional group. The auxiliary agent may be, for example, an anti-corrosion agent that provides an anti-corrosion effect, a UV absorber that provides a UV absorption effect, or a molecular weight regulator for adjusting the molecular weight of the product (polymer), and may, for example, have a highly polar functional group or have a corrosive thiol. In addition, the oligomer may be a short-chain polymer generated due to the incomplete reaction during the polymerization process, and the oligomer may have an active double bond at the end of the chain segment. If the content of the crosslinking agent, the adhesion promoter, or the auxiliary agent is excessive, or the functional groups in the crosslinking agent, the adhesion promoter, or the auxiliary agent are not completely reacted, or the oligomers remaining in the organic polymer layer 130 after the polymerization reaction are excessive, they can all lead to oxidation of the acrylate double bonds remaining in the organic polymer layer 130. As a result, highly polar substances or acidic substances (that is, volatile organic compounds) that are harmful to the metal nanowires MNW are formed. In greater detail, the guidelines for the use of reagents for the crosslinking agents, adhesion promoters, and auxiliary agents commonly used in this field can be referred to, and the actual needs of the organic polymer layer 130, such as hardness, thickness, modulus, etc. can serve as a basis to adjust the added amounts of the crosslinking agent, the adhesion promoter, and the auxiliary agent correspondingly to further control the generation amount of the oligomer. Based on the above, the present disclosure controls the content of the volatile organic compounds in the organic polymer layer 130 to be less than or equal to 1% to ensure that the organic polymer layer 130 does not attack the metal nanowires MNW in the metal nanowire layer 120, so as to meet the specification requirements of the product reliability testing and ensure that the touch product containing the optical stack structure 100 has high touch sensitivity. It should be understood that, excluding the factors of instrument detection limit and instrument error, the content of the volatile organic compounds in the organic polymer layer 130 can be substantially equal to 0% in a preferred embodiment, that is to say, the organic polymer layer 130 is completely free of any volatile organic compounds.

In the present disclosure, the content of the volatile organic compounds in the organic polymer layer 130 is defined as: a difference between a thermal weight loss of the organic polymer layer 130 measured at a measuring temperature and a water content of the organic polymer layer 130 measured at the measuring temperature. In greater detail, since the volatile organic compounds evaporate at high temperatures and water also evaporates at high temperatures, the content of the volatile organic compounds in the organic polymer layer 130 can be obtained by determining a difference between a weight loss of the organic polymer layer 130 at a specific temperature (that is, the thermal weight loss, that is to say, a total evaporation amount of the volatile organic compounds and moisture) and an evaporation amount of the moisture in the organic polymer layer 130 at the specific temperature (that is, the water content). A description about "a method for measuring the thermal weight loss of the organic polymer layer 130" and "a method for measuring the water content of the organic polymer layer 130" are provided in sequence as follows.

First, for "the method for measuring the thermal weight loss of the organic polymer layer 130", in the present disclosure the thermal weight loss of the organic polymer layer 130 can be obtained by performing the thermalgravimetric analysis (TGA) on the organic polymer layer 130. In greater detail, the method for measuring the thermal weight loss of the organic polymer layer 130 includes the following steps. Step S1': Remove about 20 milligrams (mg) from the organic polymer layer 130 (polymer for short) in a product by using the heating-wire-cutting method or the freezing method. For specific details of the heating-wire-cutting method or the freezing method, please refer to the foregoing description and a description in this regard is not repeated. Step S2': The removed polymer is allowed to stand for 24 hours in a dust-free environment with a temperature of 25±3° C. and a humidity of 50±5% RH. Step S3': The sample holder of the thermogravimetric analyzer (model: TA TGA-500) is placed on the weighing pan of the thermogravimetric analyzer and zeroed (tared). Step S4': Place the settled polymer in the tared sample holder. Step S5': Raise the temperature to 30° C. at a rate of 10° C./min, and maintain the temperature at 30° C. until the fluctuation of weight displayed by the thermogravimetric analyzer is less than 1 μg/min, and record a weight WI of the polymer at this time. Step S6': Raise the temperature to 120° C. at a rate of 10° C./min, and maintain the temperature at 120° C. for 1 hour, and record a weight WF of the polymer at this time. Step S7': Calculate a difference by subtracting the weight WI from the weight WF through the thermogravimetric analyzer. After the above step S1' to step S7', the thermogravimetric loss (the thermal weight loss) of the polymer (the organic polymer layer 130) can be obtained.

Then, for "the method for measuring the water content of the organic polymer layer 130", in the present disclosure the water content of the organic polymer layer 130 can be obtained by performing the Karl-Fisher titration on the organic polymer layer 130. In greater detail, the method for measuring the water content of the organic polymer layer 130 includes the following steps. Step S1": Remove about 50 mg from the organic polymer layer 130 (polymer for short) in a product by using the heating-wire-cutting method or the freezing method. For specific details of the heating-wire-cutting method or the freezing method, please refer to the foregoing description and a description in this regard is not repeated. Step S2": The removed polymer is allowed to stand for 24 hours in a dust-free environment with a temperature of 25±3° C. and a humidity of 50±5% RH. Step S3": The removed polymer is weighed (weight accuracy to 0.0001 g), and the weight of the polymer is input into a Karl-Fischer titrator (model: Metrohm KF Titrando 851). Step S4": Put the polymer in the Karl-Fischer titrator, and set the temperature to 120° C., the pump flow rate to 40 ml/min, and the extraction time to 1500 seconds. Step S5": After the titration is completed, data of the water content of the polymer measured by the Karl-Fischer titrator is output. After the above step S1" to step S5", the water content of the polymer (the organic polymer layer 130) can be obtained.

After the above step S1' to step S7' are performed to obtain the thermal weight loss of the organic polymer layer 130 measured at a measuring temperature of 120° C. and after step S1" to step S5" are performed to obtain the water content of the organic polymer layer 130 measured at the measuring temperature of 120° C., the water content can be subtracted from the thermal weight loss to obtain the difference between the thermal weight loss and the water content of the organic polymer layer 130, thus obtaining the content of the volatile organic compounds in the organic polymer layer 130 of the present disclosure. It is noted that, the polymer used in the above step S1' to step S7' and the polymer used in the above step S1" to step S5" may be polymer samples taken from different positions in the same product. In some other embodiments, it is also possible to measure the thermal weight loss of a polymer first, and allow the same polymer whose thermal weight loss has been measured to stand in a dust-free environment with a temperature of 25±3° C. and a humidity of 50±5% for 24 hours, and then measure the water content of the polymer. However, in this embodiment 50 mg of polymer is taken as the polymer sample.

The present disclosure improves adaptability between the organic polymer layer 130 and the metal nanowires MNW in the metal nanowire layer 120 by making the crosslinking degree of the organic polymer layer 130 fall within the suitable range and by making the content of the volatile organic compounds in the organic polymer layer 130 fall within the suitable range to ensure that the organic polymer layer 130 itself will not attack (or corrode) the metal nanowires MNW in the metal nanowire layer 120. As a result, the specification requirements for product reliability testing are met. In greater detail, the term "meeting the specification requirements of the product reliability testing" in the present disclosure means that a resistance change rate (ΔR) of the optical stack structure 100 is less than or equal to 10% and greater than or equal to −10% after the optical stack structure 100 of the present disclosure undergoes a high-temperature/high-humidity HS8585 test (that is, a temperature of 85° C., a relative humidity of 85%, and a DC voltage of 5 volts is applied) for 504 hours.

A description about a method for measuring the resistance (sheet resistance) change rate of the optical stack structure 100 is further provided. In this measurement method, the measurement equipment is a non-contact sheet resistance measurement system (model: Napson EC-80P-PN), and the measurement is performed at room temperature. The detailed measurement method includes the following steps. Step S11: Power on and turn on the non-contact sheet resistance measurement system, and warm the non-contact sheet resistance measurement system up for 20 minutes. Step S12: In M-H mode, press the setting key of the non-contact sheet resistance measurement system and select "sheet test". Step S13: Lay the optical stack structure 100 (including the substrate 110, the metal nanowire layer 120, and the organic polymer layer 130) that has not undergone the high-temperature/high-humidity test flat on an insulating table. Step S14: Vertically contact the tips of the probes to any position on a surface of the metal nanowire layer 120. Step S15: Wait until "complete" is displayed after the sheet resistance displayed by the non-contact sheet resistance measurement system, and record the sheet resistance. Step S16: Lift the probes to prepare for the next test (under normal circumstances, "complete" will disappear after the probes are lifted, and the next test can be performed without resetting; however, if "complete" does not disappear, then the setting key needs to be pressed twice in succession to perform the next test). Step S17: Repeat step S14 to step S15 for many times (for example, 10 times), and take the average value of the sheet resistances obtained by the multiple measurements as a sheet resistance $R_I$ of the optical stack structure 100 that has not undergone the high-temperature/high-humidity test. Step S18: Repeat step S11 to step S13. In step S13, lay the same optical stack structure 100 that has undergone the high-temperature/high-humidity HS8585 test for 504 hours flat on an insulating table. Step S19: Repeat step S14 to step S15 for many times (for example, 10 times), and take the average value of the sheet resistances obtained by the multiple measurements as a sheet resistance $R_F$ of the optical stack structure 100 that has undergone the high-temperature/high-humidity HS8585 test for 504 hours. Step S20: Calculate the resistance change rate ($\Delta R$) of the optical stack structure 100 according to the following formula (2). After the above step S11 to step S20, the resistance change rate ($\Delta R$) of the optical stack structure 100 of the present disclosure can be obtained.

$$\Delta R(\%) = 100\% \times (R_F - R_I)/R_I \quad \text{Formula(2)}$$

In some embodiments, a thickness H3 of the organic polymer layer 130 may be greater than or equal to 25 microns (μm) and less than or equal to 125 μm. The units of the thickness H3 of the organic polymer layer 130 and the thickness H2 of the metal nanowire layer 120 belong to different orders of magnitude, which is helpful for the organic polymer layer 130 to further protect the metal nanowire layer 120. The probability that moisture intrudes into the metal nanowire layer 120 is reduced, thus reducing the probability of electromigration phenomenon of the metal nanowires MNW or delaying the time that the metal nanowires MNW have electromigration. As a result, the specification requirements for product reliability testing are better achieved, and the touch product including the optical stack structure 100 is better ensured to have high touch sensitivity.

Additionally, since the matrix OC of the metal nanowire layer 120 directly contacts the metal nanowires MNW, in some embodiments a crosslinking degree of the matrix OC of the metal nanowire layer 120 can be further made fall within a suitable range, and a content of volatile organic compounds in the matrix OC of the metal nanowire layer 120 can be further made fall within a suitable range to better protect the metal nanowires MNW. The probability of corrosion of the metal nanowires MNW is further reduced, which is helpful in achieving the specification requirements for product reliability testing. In greater detail, in some embodiments the crosslinking degree of the matrix OC can be controlled within a range greater than or equal to 80% and less than or equal to 100%, and the content of the volatile organic compounds in the matrix OC can be controlled within a range less than or equal to 1%. The content of the volatile organic compounds in the matrix OC is defined as: a difference between a thermal weight loss of the matrix OC measured at a measuring temperature (that is, 120° C.) and a water content of the matrix OC measured at the measuring temperature (that is, 120° C.). For the respective definitions and measurement methods of the crosslinking degree and the content of the volatile organic compounds of the matrix OC, please refer to the respective definitions and measurement methods of the crosslinking degree and the content of the volatile organic compounds of the organic polymer layer 130 mentioned preciously, and a description in this regard is not repeated. Excluding the factors of instrument detection limit and instrument error, the content of the volatile organic compounds in the matrix OC can be substantially equal to 0% in a preferred embodiment, that is to say, the matrix OC is completely free of any volatile organic compounds.

A description is provided with reference to Table 1. Table 1 verifies in greater detail the influences of the crosslinking degree and the content of the volatile organic compounds of the organic polymer layer 130 of the present disclosure on whether the optical stack structure 100 can pass the reliability test or not through each comparative example and each of the embodiments. It is noted that in Table 1, the stacking structures of the optical stack structures 100 of each of the embodiments and each comparative example are the same as a stacking structure of FIG. 3, in which the metal nanowire layer 120 and a passivation layer 150 are regarded as an integration to further measure the properties of the organic polymer layer 130 in the optical stack structure 100. It should be understood that the key point of Table 1 is the influences of the properties of the organic polymer layer 130 on whether the optical stack structure 100 can pass the reliability test or not, and the present disclosure is not limited to the stacking structure of each of the embodiments in Table 1.

TABLE 1

| | Properties of the organic polymer layer | | Resistance change rate $\Delta R$ (%) of |
|---|---|---|---|
| | Crosslinking Degree | Content of volatile organic compounds (%) (thermal weight loss (%)-water content(%)) | the optical stack structure after undergoing the high-temperature/high-humidity HS8585 test for 504 hours |
| Comparative example 1 | 75.9 | 0.74 | 79.4 |
| Comparative example 2 | 68.5 | 1.42 | Resistance change rate is too large to be measured |
| Comparative example 3 | 82.5 | 1.27 | 50.3 |
| Comparative example 4 | 92.6 | 1.39 | Resistance change rate is too large to be measured |
| Comparative example 5 | 91.6 | 1.42 | Resistance change rate is too large to be measured |
| Comparative example 6 | 91.7 | 1.61 | Resistance change rate is too large to be measured |
| Comparative example 7 | 93.4 | 1.59 | Resistance change rate is too large to be measured |
| Comparative example 8 | 73.7 | 0.76 | 34.7 |
| Embodiment | 86.3 | 0.56 | −1.5 |

TABLE 1-continued

| | Properties of the organic polymer layer | | Resistance change rate ΔR (%) of |
| --- | --- | --- | --- |
| | Crosslinking Degree | Content of volatile organic compounds (%) (thermal weight loss (%)-water content(%)) | the optical stack structure after undergoing the high-temperature/high-humidity HS8585 test for 504 hours |
| Embodiment 1 | 88.9 | 0.62 | −3.3 |
| Embodiment 2 | | | |
| Embodiment 3 | 91.1 | 0.32 | 9.6 |

First of all, it should be noted that the cured organic polymer layer 130 (film, sheet) used in Embodiment 1 is purchased from AVIC NEW MATERIALS HK CO., LIMITED, and its commodity model is AVIC FP301. The cured organic polymer layer 130 (film, sheet) used in Embodiment 2 is purchased from SELEN SCIENCE & TECHNOLOGY CO., LTD, and its commodity model is Selen SLC-6305. The cured organic polymer layer 130 (film, sheet) used in Embodiment 3 is purchased from FUYIN GROUP, and its commodity model is 29A-7. In addition, each of the above commodities is developed according to the requirements for the crosslinking degree and the content of the volatile organic compounds of the organic polymer layer 130 specified in the present disclosure. As can be seen from Comparative Examples 1 to 8 in Table 1, when any one of the crosslinking degree and the content of the volatile organic compounds of the organic polymer layer 130 does not fall within the ranges specified by the present disclosure, the optical stack structure 100 cannot pass the relevant reliability test. However, as can be seen from Embodiments 1-3 in Table 1, when both the crosslinking degree and the content of the volatile organic compounds of the organic polymer layer 130 fall within the ranges specified by the present disclosure, the optical stack structure 100 can pass the relevant reliability test (the resistance change rate is less than or equal to 10% and greater than or equal to −10%).

In some embodiments, the probability of corrosion of the metal nanowires MNW in the metal nanowire layer 120 can be reduced by further adjusting a material of the cover plate 140. In greater detail, by controlling contents of highly reactive elements (such as potassium, sodium, and calcium elements) in the cover plate 140, the probability of electromigration phenomenon of the metal nanowires MNW induced by diffusion of ions (such as potassium ions, sodium ions, and calcium ions) generated by the highly active elements can be reduced. As a result, the specification requirements for product reliability testing are better achieved, and the touch product containing the optical stack structure 100 is better ensured to have high touch sensitivity. In greater detail, in some embodiments the respective contents of potassium element and calcium element measured by the energy-dispersive X-ray (EDX) analysis of the material of the cover plate 140 can be controlled within the range less than or equal to 1%. In some other embodiments, the respective contents of sodium element and potassium element measured by the EDX analysis of the material of the cover plate 140 can be controlled within the range less than or equal to 1%. When the contents of the highly active elements in the material of the cover plate 140 are controlled within the above range, the probability of electromigration phenomenon of the metal nanowires MNW can be better reduced. In greater detail, when the contents of the above highly active elements are greater than 1%, the ions generated by the highly active elements will have a greater chance to diffuse into the metal nanowire layer 120, thus making the metal nanowires MNW easier to dissociate electrochemically and to electromigrate. Excluding the factors of instrument detection limit and instrument error, the respective contents of potassium element and calcium element in the cover plate 140 or the respective contents of sodium element and potassium element in the cover 140 can be substantially equal to 0% in a preferred embodiment, that is to say, the cover 140 is completely free of any potassium element and calcium element or sodium element and potassium element.

Reference is made to Table 2. Table 2 verifies in greater detail the influences of the material of the cover plate 140 on whether the optical stack structure 100 can pass the reliability test or not through each comparative example and each of the embodiments. It is noted that in Table 2, the stacking structures of the optical stack structures 100 of each of the embodiments and each comparative example are the same as the stacking structure of FIG. 1A. In addition, the content of each of the elements is measured by the EDX analysis, and the detection limit of the EDX analyzer used is 1%

TABLE 2

| | Contents of highly active elements in the material of the cover plate (%) | | | Commodity model of the organic polymer layer | Resistance change rate ΔR (%) of the optical stack structure after undergoing the high-temperature/high-humidity HS8585 test for 504 hours |
| --- | --- | --- | --- | --- | --- |
| | Potassium element | Calcium element | Sodium element | | |
| Comparative example 1 | 14.52 | 7.12 | 5.12 | Selen SLC-6305 | −2.8 |
| Embodiment 1 | Less than detection limit | Less than detection limit | 23.02 | Selen SLC-6305 | −3.2 |
| Embodiment 2 | Less than detection limit | 9.12 | Less than detection limit | Selen SLC-6305 | −3.5 |
| Control example 1 | 14.52 | 7.12 | 8.15 | FUYIN 28A | 67.2 |
| Control example 2 | Less than detection limit | Less than detection limit | 23.02 | FUYIN 28A | 30.0 |
| Control example 3 | Less than detection limit | 9.12 | Less than detection limit | FUYIN 28A | 25.8 |

As can be seen from Comparative Example 1 and Embodiments 1 to 2 in Table 2, when a polymer meeting the specifications (the crosslinking degree and the content of the volatile organic components) defined by the present disclosure is used as the organic polymer layer 130, both controlling the respective contents of potassium element and calcium element contained in the material of the cover plate 140 within the range less than or equal to 1% and controlling the respective contents of potassium element and sodium element contained in the material of the cover plate 140 within the range less than or equal to 1% are helpful in reducing the resistance change rate of the optical stack structure 100. Additionally, the present disclosure further provides Control Examples 1 to 3, which adopt the polymer (purchased from FUYIN Group, commodity model 28A) that does not meet the specifications (the crosslinking degree and the content of the volatile organic components) defined by the present disclosure as the organic polymers layer 130. In Comparative Examples 1 to 3, both controlling the respective contents of potassium element and calcium element contained in the material of the cover plate 140 within the range less than or equal to 1% and controlling the respective contents of potassium element and sodium element contained in the material of the cover plate 140 within the range less than or equal to 1% are helpful in reducing the resistance change rate of the optical stack structure 100. It is thus understood that, by controlling the contents of potassium, sodium, and calcium elements in the cover plate 140, the probability of electromigration phenomenon of the metal nanowires MNW can be reduced. As a result, the specification requirements for product reliability testing are better achieved, and the touch product containing the optical stack structure 100 is better ensured to have high touch sensitivity.

Figure 3:
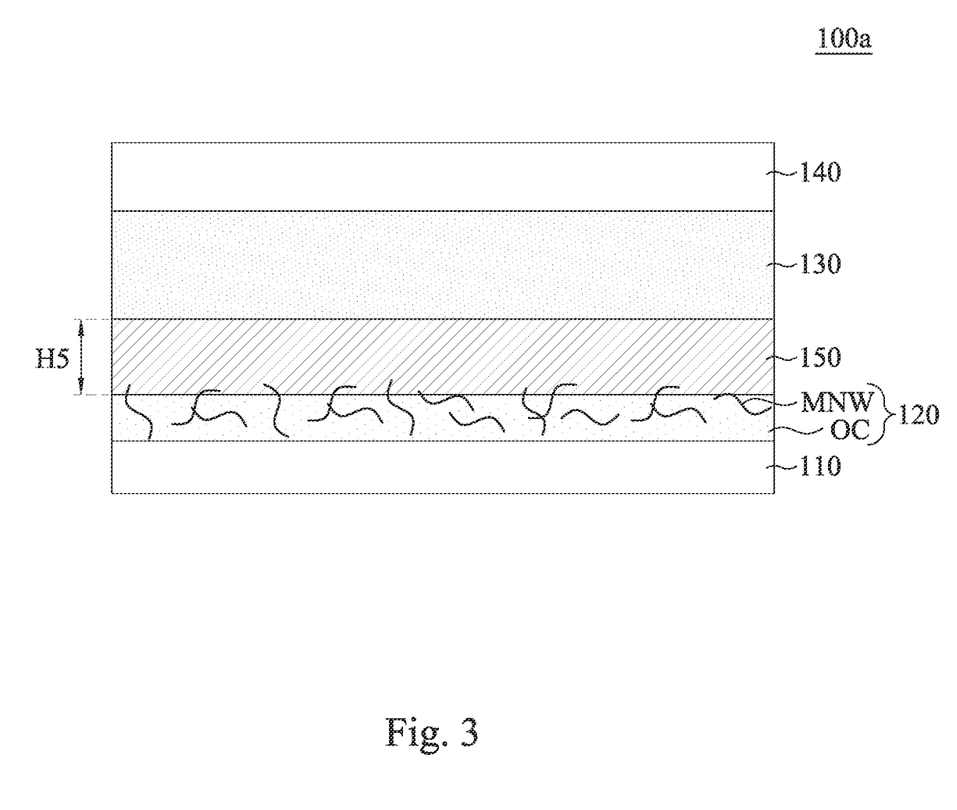
FIG. 3 depicts a schematic diagram of a stacking structure of an optical stack structure according to some other embodiments of the present disclosure.

Reference is made to FIG. 3. FIG. 3 depicts a schematic diagram of a stacking structure of an optical stack structure 100a according to some other embodiments of the present disclosure. At least one difference between the optical stack structure 100a of FIG. 3 and the optical stack 100 of FIG. 1A lies in that the optical stack structure 100a further includes the passivation layer 150 disposed between the metal nanowire layer 120 and the organic polymer layer 130. In other words, the metal nanowire layer 120, the passivation layer 150, the organic polymer layer 130, and the cover plate 140 are sequentially stacked on the substrate 110. In the present embodiment, part of the metal nanowires MNW in the metal nanowire layer 120 are further embedded into the passivation layer 150. For detailed structural features, please refer to the foregoing description of FIG. 1B and a description in this regard is not repeated. In some embodiments, the passivation layer 150 can have good scratch resistance, and thus can further protect the metal nanowire layer 120 from being damaged during the fabrication process of the optical stack structure 100a. In some embodiments, a thickness H5 of the passivation layer 150 may be, for example, greater than or equal to 5 μm and less than or equal to 10 μm to better protect the metal nanowire layer 120. The possibility of unnecessary visibility of the passivation layer 150 caused by the excessively great thickness H5 is reduced, and the possibility of abrasions of the metal nanowire layer 120 caused by wearing out or scratching during the process due to the excessively small thickness H5 is reduced.

In addition, since in the present embodiment the passivation layer 150 is closer to the metal nanowires MNW than the organic polymer layer 130, in some embodiments a crosslinking degree of the passivation layer 150 can be further made fall within a suitable range and a content of volatile organic compounds in the passivation layer 150 can be further made fall within a suitable range, so that the metal nanowires MNW can be further protected. The probability of corrosion of the metal nanowires MNW is further reduced, which is helpful in further achieving the specification requirements for product reliability testing. In greater detail, in some embodiments the crosslinking degree of the passivation layer 150 can be controlled within the range greater than or equal to 80% and less than or equal to 100%, and the content of the volatile organic compounds in the passivation layer 150 can be controlled within the range less than or equal to 1%. The content of the volatile organic compounds in the passivation layer 150 is defined as: a difference between a thermal weight loss of the passivation layer 150 measured at a measuring temperature (120° C.) and a water content of the passivation layer 150 measured at the measuring temperature (120° C.). For the respective definitions and measurement methods of the crosslinking degree and the content of the volatile organic compounds of the passivation layer 150, please refer to the respective definitions and measurement methods of the crosslinking degree and the content of the volatile organic compounds of the organic polymer layer 130 mentioned preciously, and a description in this regard is not repeated. Excluding the factors of instrument detection limit and instrument error, the content of the volatile organic compounds in the passivation layer 150 can be substantially equal to 0% in a preferred embodiment, that is to say, the passivation layer 150 is completely free of any volatile organic compounds.

Figure 4:
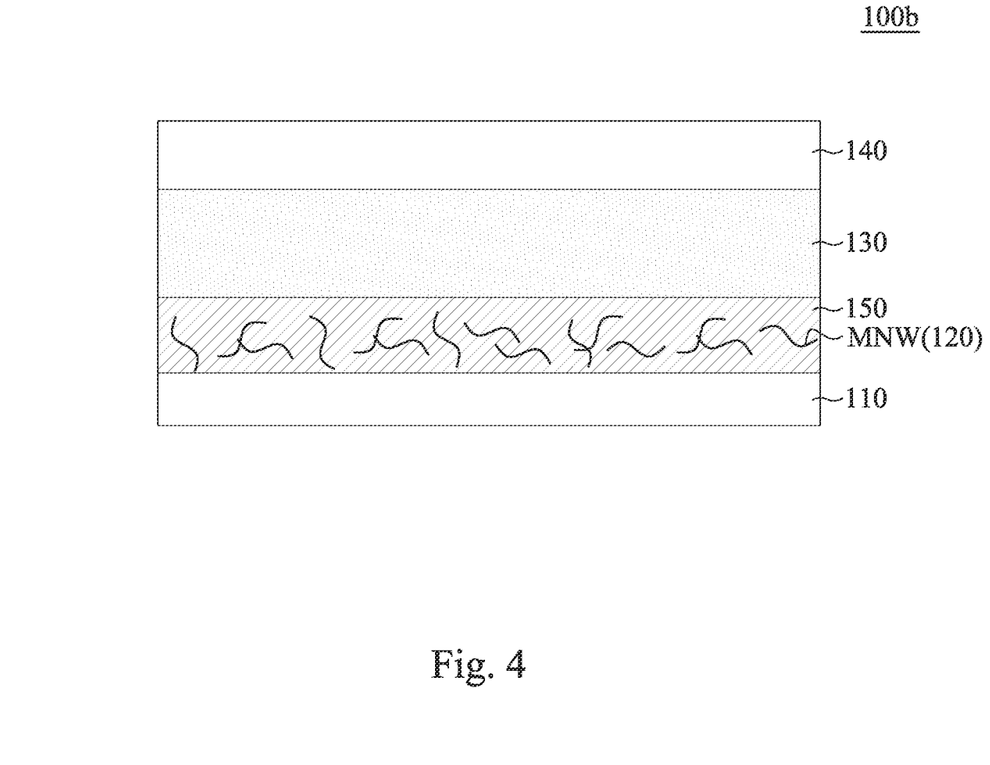
FIG. 4 depicts a schematic diagram of a stacking structure of an optical stack structure according to some other embodiments of the present disclosure.

Reference is made to FIG. 4. FIG. 4 depicts a schematic diagram of a stacking structure of an optical stack structure 100b according to some other embodiments of the present disclosure. At least one difference between the optical stack structure 100b of FIG. 4 and the optical stack 100a of FIG. 3 lies in that the metal nanowire layer 120 of the optical stack structure 100b does not include the matrix OC (that is, the metal nanowire layer 120 has the metal nanowires MNW), and the passivation layer 150 directly contacts the substrate 110 and directly contacts and encapsulates the metal nanowires MNW. That is to say, the passivation layer 150 is disposed between each of the metal nanowires MNW and the organic polymer layer 130. In the present embodiment, the passivation layer 150 can completely encapsulate all of the metal nanowires MNW, such that all the metal nanowires MNW are completely distributed in the passivation layer 150 without being partially embedded into the organic polymer layer 130. By omitting the disposition of the matrix OC in the metal nanowire layer 120, the process steps can be reduced, the process cost can be reduced, and it is also advantageous for the optical stack structure 100b to be thinned. In addition, since the passivation layer 150 can have the crosslinking degree greater than or equal to 80% and less than or equal to 100% and the content of the volatile organic compounds less than or equal to 1%, the passivation layer 150 does not attack (corrode) the metal nanowires MNW even if the passivation layer 150 directly contacts the metal nanowires MNW. As a result, the optical stack structure 100b of FIG. 4 can still meet the specification requirements for product reliability testing.

Figure 5:
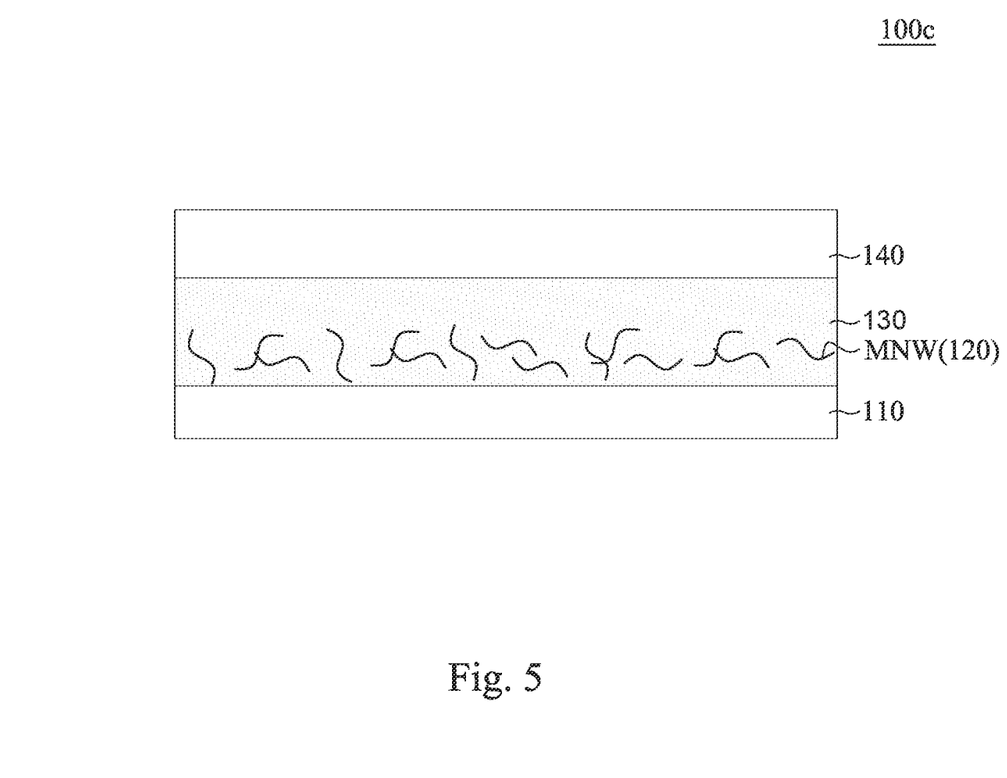
FIG. 5 depicts a schematic diagram of a stacking structure of an optical stack structure according to some other embodiments of the present disclosure.

Reference is made to FIG. 5. FIG. 5 depicts a schematic diagram of a stacking structure of an optical stack structure 100c according to yet some other embodiments of the present disclosure. At least one difference between the optical stack structure 100c of FIG. 5 and the optical stack 100b of FIG. 4 lies in that the optical stack structure 100c does not include the passivation layer 150 and the organic polymer layer 130 contacts the substrate 110 and directly contacts and encapsulates the metal nanowires MNW. That is to say, the organic polymer layer 130 is disposed between each of the metal nanowires MNW and the cover plate 140. In the present embodiment, the organic polymer layer 130 can completely enclose all of the metal nanowires MNW, such that all the metal nanowires MNW are completely distributed in the organic polymer layer 130. As compared with the optical stack structure 100b of FIG. 4, the process steps can be reduced, the process cost can be reduced, and it is also advantageous for the optical stack structure 100c to be thinned because the optical stack structure 100c of FIG. 5 further omits the disposition of the passivation layer 150.

According to the above embodiments of the present disclosure, the optical stack structure of the present disclosure includes the metal nanowire layer and the organic polymer layer. Since the organic polymer layer has the crosslinking degree and the content of the volatile organic compounds specified by the present disclosure, the organic polymer layer can be ensured not to attack (or corrode) the metal nanowires in the metal nanowire layer. As a result, the optical stack structure of the present disclosure can achieve the specification requirements for product reliability testing, and the touch product containing the optical stack structure is ensured to have high touch sensitivity. Additionally, the stability of the metal nanowires can be further improved by further allowing other layers in the optical stack structure (for example, the matrix in the metal nanowire layer, the passivation layer) to have the crosslinking degree and content of the volatile organic compounds specified by the present disclosure, thus extending the service life of the optical stack structure. In addition, by controlling the contents of the highly reactive elements in the cover plate, the probability of electromigration phenomenon of the metal nanowires can be further reduced to better achieve the specification requirements for product reliability testing. In addition, the optical stack structure of the present disclosure can have a variety of stacking structure designs, so as to meet the requirements for various products on the premise that the optical stack structure is ensured to meet the specification requirements for product reliability testing.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. An optical stack structure comprising:
a metal nanowire layer, wherein the metal nanowire layer comprises a matrix and a plurality of metal nanowires distributed in the matrix;
an organic polymer layer disposed on the metal nanowire layer, wherein a crosslinking degree of the organic polymer layer is greater than or equal to 80% and less than or equal to 100%, a content of volatile organic compounds in the organic polymer layer is less than or equal to 1%, and the content of the volatile organic compounds in the organic polymer layer is defined as a difference between a thermal weight loss of the organic polymer layer measured at a measuring temperature and a water content of the organic polymer layer measured at the measuring temperature; and
a passivation layer disposed between the metal nanowire layer and the organic polymer layer, wherein some of the metal nanowires are embedded into the passivation layer, wherein a crosslinking degree of the passivation layer is greater than or equal to 80% and less than or equal to 100%, a content of volatile organic compounds in the passivation layer is less than or equal to 1%, and the content of the volatile organic compounds in the passivation layer is defined as a difference between a thermal weight loss of the passivation layer measured at the measuring temperature and a water content of the passivation layer measured at the measuring temperature.

2. The optical stack structure of claim 1, wherein the organic polymer layer directly contacts and encapsulates the metal nanowires.

3. The optical stack structure of claim 1, wherein a crosslinking degree of the matrix is greater than or equal to 80% and less than or equal to 100%, a content of volatile organic compounds in the matrix is less than or equal to 1%, and the content of the volatile organic compounds in the matrix is defined as a difference between a thermal weight loss of the matrix measured at the measuring temperature and a water content of the matrix measured at the measuring temperature.

4. The optical stack structure of claim 1, wherein some of the metal nanowires are embedded into the organic polymer layer.

5. The optical stack structure of claim 1, wherein the passivation layer directly contacts and encapsulates the metal nanowires.

6. The optical stack structure of claim 1, further comprising a cover plate disposed on the organic polymer layer, wherein a content of potassium element and a content of calcium element measured by an energy-dispersive X-ray analysis of a material of the cover plate are respectively less than or equal to 1%.

7. The optical stack structure of claim 1, further comprising a cover plate disposed on the organic polymer layer, wherein a content of sodium element and a content of potassium element measured by an energy-dispersive X-ray analysis of a material of the cover plate are respectively less than or equal to 1%.

8. An optical stack structure comprising:
a metal nanowire layer, wherein the metal nanowire layer comprises a matrix and a plurality of metal nanowires distributed in the matrix;
an organic polymer layer disposed on the metal nanowire layer, wherein a crosslinking degree of the organic polymer layer is greater than or equal to 85% and less than or equal to 92%, a content of volatile organic compounds in the organic polymer layer is less than or equal to 0.65%, and the content of the volatile organic compounds in the organic polymer layer is defined as a difference between a thermal weight loss of the organic polymer layer measured at a measuring temperature and a water content of the organic polymer layer measured at the measuring temperature; and
a passivation layer disposed between the metal nanowire layer and the organic polymer layer, wherein some of the metal nanowires are embedded into the passivation layer, wherein a crosslinking degree of the passivation layer is greater than or equal to 80% and less than or equal to 100%, a content of volatile organic compounds in the passivation layer is less than or equal to 1%, and the content of the volatile organic compounds in the passivation layer is defined as a difference between a thermal weight loss of the passivation layer measured at the measuring temperature and a water content of the passivation layer measured at the measuring temperature.

9. The optical stack structure of claim 8, wherein the crosslinking degree of the organic polymer layer is about 86.3% and the content of volatile organic compounds in the organic polymer layer is about 0.56%.

10. The optical stack structure of claim 8, wherein the crosslinking degree of the organic polymer layer is about 88.9% and the content of volatile organic compounds in the organic polymer layer is about 0.62%.

11. The optical stack structure of claim 8, wherein the crosslinking degree of the organic polymer layer is about 91.1% and the content of volatile organic compounds in the organic polymer layer is about 0.32%.

12. The optical stack structure of claim 8, further comprising a cover plate disposed on the organic polymer layer, wherein a content of potassium element and a content of calcium element measured by an energy-dispersive X-ray analysis of a material of the cover plate are respectively less than or equal to 1%.

13. The optical stack structure of claim 8, further comprising a cover plate disposed on the organic polymer layer, wherein a content of sodium element and a content of potassium element measured by an energy-dispersive X-ray analysis of a material of the cover plate are respectively less than or equal to 1%.

\* \* \* \* \*